United States Patent [19]
Takayanagi et al.

[11] Patent Number: 5,551,735
[45] Date of Patent: Sep. 3, 1996

[54] TUBE FITTING

[75] Inventors: Akira Takayanagi, Nishikasugai-gun; Toshihiro Kumagai, Tajimi; Kinji Hosoya, Gotenba, all of Japan

[73] Assignees: Tokai Rubber Industries, Ltd., Komaki; Kabushiki Kaisha AOI, Gotenba, both of Japan

[21] Appl. No.: 261,060

[22] Filed: Jun. 14, 1994

[30] Foreign Application Priority Data

Jun. 14, 1993 [JP] Japan .................. 5-165894

[51] Int. Cl.⁶ .................................. F16L 21/06
[52] U.S. Cl. .................. 285/323; 285/341; 285/243
[58] Field of Search ............................. 285/340, 341, 285/243, 322, 323, 39

[56] References Cited

U.S. PATENT DOCUMENTS

| | | | |
|---|---|---|---|
| 3,909,046 | 9/1975 | Legris | 285/39 |
| 3,999,783 | 12/1976 | Legris | 285/243 X |
| 4,021,062 | 5/1977 | Mariaulle | 285/340 X |
| 4,123,090 | 10/1978 | Kotsakis et al. | 285/340 X |
| 4,445,714 | 5/1984 | Kisiel, III | 285/323 X |
| 4,593,943 | 6/1986 | Hama et al. | 285/340 X |
| 4,951,975 | 8/1990 | Bartholomew | 285/111 |
| 5,160,179 | 11/1992 | Takagi | 285/39 X |
| 5,174,611 | 12/1992 | Byrd et al. | 285/323 X |
| 5,348,354 | 9/1994 | Bardoureaux | 285/39 X |

FOREIGN PATENT DOCUMENTS

| | | |
|---|---|---|
| 0197874 | 10/1986 | European Pat. Off. . |
| 0268251 | 5/1988 | European Pat. Off. . |
| 2398251 | 3/1974 | France . |
| 2584474 | 1/1987 | France .................. 285/323 |
| 2683019 | 4/1993 | France . |
| 2413750 | 11/1974 | Germany ................ 285/323 |

*Primary Examiner*—Terry Lee Melius
*Assistant Examiner*—Heather Chun Shackelford
*Attorney, Agent, or Firm*—Jacobson, Price, Holman & Stern, PLLC

[57] ABSTRACT

A tube fitting includes a tubular body, an annular clamping member, a tubular inner pipe, a releasing member, and a sealing ring. The clamping member is disposed axially movably in an axial bore of the body, and includes a claw and an outer peripheral portion. The claw has an inclined surface projecting in a centripetal direction as the inclined surface extends away from an opening of the body, and engages with an outer peripheral surface of a tube fitted into the axial bore via the opening. The outer peripheral portion contacts with a regulatory surface of the body, and is pressed in a centripetal direction thereby, and accordingly presses the claw onto the outer peripheral surface of the tube. The inner pipe is disposed in the tube coaxially with an inner peripheral surface of the tube at an end of the tube. The releasing member includes a tubular base and a leading end. The base is disposed axially movably in the axial bore on an outer side with respect to the regulatory surface. The leading end extends from the base over the regulatory surface to an inner side of the axial bore, and goes between the inclined surface of the claw and the outer peripheral surface of the tube. The sealing ring seals between an inner peripheral surface of the axial bore and an outer peripheral surface of the tube fixed in the axial bore.

6 Claims, 11 Drawing Sheets

5,551,735

TUBE FITTING

BACKGROUND OF THE INVENTION

1. Field of the Invention

The present invention relates to a tube fitting, and particularly relates to a tube fitting which can be connected with a soft or semi-hard tube without causing leakage.

2. Description of the Related Art

As illustrated in FIGS. 24 and 25, conventional tube fittings have been known which are designed to be connected with a soft or semi-hard tube, for example a resin tube. The tube fitting illustrated in FIG. 24 comprises a tubular body 110, an annular clamping member 120, a releasing member 130, and a sealing ring 140. The body 110 includes a regulatory surface 112 on the inner peripheral surface, regulatory surface 112 which extends in the centripetal direction as an end opening 111 comes near, and an axial bore 113 into which a tube 150 is fitted via the opening 111. The clamping member 120 is disposed slidably in the axial direction on an inner side with respect to the regulatory surface 112 in the axial bore 113. The clamping member 120 includes a plurality of arms 125 which extend from a tubular end portion 124 in the axial direction, a claw 122 disposed at the free end of the arms 123, and an outer peripheral portion 123, formed in an annular shape. The claw 122 has an inclined surface 121 which projects in the centripetal direction as the opening 111 moves away and which engages with an outer peripheral surface of the tube 150 fitted into the axial bore 113 via the opening 111. The outer peripheral portion 123 contacts with the regulatory surface 112 of the body 110, and thereby it is pressed in the centripetal direction by the regulatory surface 112 so as to press the claw 122 onto the outer peripheral surface of the tube 150. The releasing member 130 includes a tubular base 131 and a leading end 132. The tubular base 131 is disposed slidably in the axial direction of the axial bore 113 on the side of the opening 111. The sealing ring 140 is an O-ring made from rubber, and it is disposed between the base 131 and the leading end 132 of the releasing member 130.

In this conventional tube fitting, the tube 150 is fitted into the axial bore 113 via the opening 111, and it is later pulled back. Then, the outer peripheral portion 123 of the clamping member 120 is brought into contact with the regulatory surface 112 disposed in the axial bore 113 of the body 110, and it is pressed in the centripetal direction. Thus, the claw 122 is pressed onto the outer peripheral surface of the tube 150, and it pinches and engages with the outer peripheral surface of the tube 150. By the engagement between the claw 122 and the tube 150, the tube 150 is engaged with the body 110. The sealing ring 140 seals between the outer peripheral surface of the tube 150 and the inner peripheral surface of the axial bore 113 of the body 110. On the other hand, when the base 131 of the releasing member 130 is pressed into the axial bore 113, the base 131 pushes the leading end 132 in the axial direction by way of the sealing ring 140. Accordingly, the front end of the leading end 132 is brought into contact with the inclined surface 121 of the clamping member 120, and then the inclined surface 121 is urged to the inner side of the axial bore 113 in the centrifugal direction. Consequently, the claw 122 of the clamping member 120 is moved in the centrifugal direction, and it is separated from the outer peripheral surface of the tube 150. As a result, the tube 150 is released from the clamping member 120, and it can be pulled out of the axial bore 113 of the body 110.

The other conventional tube fitting illustrated in FIG. 25 comprises a tubular body 210 including an axial bore 213, an annular clamping member 220, a sealing ring 240, and an inner pipe 260. The body 210 has an opening at an end into which an annular end cover 214 is screwed coaxially. The end cover 214 has a regulatory surface 212 which extends in the centrifugal direction as it goes to the inner side of the axial bore 213. The inner pipe 260 is coaxially engaged with and fixed to the inner peripheral surface 213 of the body 210 at the end. Thus, on one of the sides of the body 210, there is formed a tubular groove 216 between the outer peripheral surface of the inner pipe 260 and the inner peripheral surface of the axial bore 213 of the body 210. The clamping member 220 and the sealing ring 240 are held coaxially in the tubular groove 216 whose opening end is plugged by the end cover 214.

In this conventional tube fitting, the clamping member 220 and the sealing ring 240 are disposed in the axial bore 213 of the body 210, and accordingly there is formed a tubular space between the outer peripheral surface of the inner pipe 260 and the clamping member 220 as well as the sealing ring 240. The tube 250 is fitted into the tubular space. In a manner similar to the conventional tube fitting illustrated in FIG. 24, the clamping member 120 is engaged with the outer peripheral surface of the tube 250 at its claw 221, and accordingly the tube 250 is engaged with the body 210 when the tube 250 is pulled back in the opposite direction.

Additionally, in this another conventional tube fitting, since the tube 250 is held between the clamping member 220 and the inner pipe 260, it is clamped with a strong clamping force. Further, when the annular end cover 214 is rotated with respect to the body 210 in the direction opposite to the screwing direction, the end cover 214 can be separated from the body 210. As a result, the tube 250 can be pulled out of the body 210.

In the conventional tube fitting illustrated in FIG. 24, dust, dirt or the like are likely to remain at the sealing ring 140. Accordingly, when the tube 150 is pulled out and it is again fitted into body 110 in order to engage therewith, this conventional tube fitting suffers from the improper sealing at the sealing ring 140.

The other conventional tube fitting illustrated in FIG. 25 requires a large amount of labor to disengage the tube 250 from the body 210. Similar to the first conventional tube fitting, dust, dirt or the like are likely to remain at the sealing ring 240 so that the sealing is inadequate.

SUMMARY OF THE INVENTION

It is therefore an object of the present invention to provide a tube fitting which does not suffer from the aforementioned problems associated with the conventional tube fittings.

A tube fitting according to the present invention comprises:

a tubular body including an opening disposed at an end, an axial bore into which a tube is fitted via the opening, and an inner peripheral surface having a regulatory surface extending in a centripetal direction as the regulatory surface approaches the opening;

an annular clamping member disposed in the axial bore on an inner side with respect to the regulatory surface, held movably in an axial direction of the axial bore, and including a claw and an outer peripheral portion, the claw having an inclined surface projecting in a centripetal direction as the regulatory surface extends in a direction away from the opening and engaging with an outer peripheral surface of the tube fitted into the axial bore via the opening, the outer peripheral portion contacting with the regulatory surface and being pressed in a centripetal direction by the regulatory surface so as to press the claw onto the outer peripheral surface of the tube;

a tubular inner pipe disposed in the tube, fitted into the axial bore via the opening, coaxially with an inner peripheral surface of the tube at an end of the tube;

a releasing member including a tubular base and a leading end, the tubular base disposed in the axial bore on an outer side with respect to the regulatory surface and held movably in an axial direction of the bore, the leading end extending from the base over the regulatory surface to an inner side of the axial bore and extending between the inclined surface of the claw and the outer peripheral surface of the tube; and a sealing ring disposed so as to seal between an inner peripheral surface of the axial bore and an outer peripheral surface of the tube fixed in the axial bore.

The releasing member can be constructed so that the base and the leading end are members independent of each other, or it can be constructed so that the base and the leading end are formed integrally.

In a preferred form, a free end of the inner pipe can be positioned so as to protrude from the opening of the body when the tube is fitted into and fixed in the axial bore of the body.

In a preferred form, a free end of the inner pipe can be positioned so as to protrude from an end of the base of the releasing member when the tube is fitted into and fixed in the axial bore of the body.

In a preferred form, the inner pipe can be separable from the body, and it can be fitted into the tube before the tube is fitted into the axial bore of the body.

In a preferred form, the inner pipe can be fixed in the axial bore of the body coaxially therewith.

In a preferred form, the sealing ring can be disposed between the base and the leading end of the releasing member. Further, the sealing ring can be disposed on an inner side with respect to the clamping member in the axial bore of the body.

In a preferred form, the clamping member can include the claw which is disposed at axially opposite ends of the clamping member, respectively.

In a preferred form, the clamping member can be constructed so as to be substantially symmetrical with respect to a cross-sectional plane which contains a center of the clamping member in an axial direction thereof.

In a preferred form, the clamping member can be made by drawing a plate blank to a tubular preform and thereafter by bending the tubular preform in a centripetal direction at an end.

In a preferred form, the releasing member can further include a first annular dust seal which is disposed on an inner peripheral surface of the base and which seals between the inner peripheral surface of the base and an outer peripheral surface of the tube.

In a preferred form, the body can further include a second tubular dust seal which seals between the opening and an outer peripheral surface of the releasing member.

In the tube fitting according to the present invention, the inner pipe prevents the deformations, such as bending, flattening or the like, resulting from the flexibility of the tube. Accordingly, there is scarcely formed a space, into which dust, dirt or the like tend to intrude, between the releasing member disposed at the leading end of the body and the tube. Consequently, it is possible to reduce dust, dirt or the like which intrude to the sealing ring. As a result, the sealing Ping can function properly for a long period of time. Moreover, since the inner pipe prevents the tube from deforming, the releasing member can be easily pushed into the inner side of the axial bore along the outer peripheral surface of the tube when disengaging the tube from the present tube fitting. Hence, it is possible to improve the disengaging of the tube in terms of operability.

In the case that the free end of the inner pipe is positioned so as to protrude from the opening of the body when the tube is fitted into and fixed in the axial bore of the body, the inner pipe can prevent deformations of the tube, such as bending or the like thereof. Accordingly, this arrangement can prevent dust, dirt or the like from passing to sealing ring. Likewise, in the case that the free end of inner pipe is positioned so as to protrude from an end of the base of the releasing member when the tube is fitted into and fixed in the axial bore of the body, the inner pipe can prevent the deformations of the tube, such as bending or the like thereof, furthermore securely.

In the case that the inner pipe is made separable from the body, and that it is fitted into the tube before the tube is fitted into the axial bore of the body, since the inner pipe securely prevents the tube from deforming like bending, flattening and so on, it is possible to quickly and reliably fit the tube into the axial bore. As a result, it is possible to improve the fitting of the tube in terms of operability.

In the case that the inner pipe is fixed in the axial bore of the body coaxially therewith, it is possible to get rid of assembling the inner pipe with the tube.

In the case that the sealing ring is disposed between the base and the leading end of the releasing member, it is possible to reliably seal between the inner peripheral surface of the sealing ring and the outer peripheral surface of the tube. Namely, when fitting the tube into the axial bore, on the leading side of the tube, the claw of the clamping member might damage the outer peripheral surface of the tube because of the sliding therewith. However, when the tube is fixed in the axial bore, on the trailing side of the tube with respect to the clamping member or the free side of the tube adjacent to the opening, there is no such damage produced on the outer peripheral surface of the tube. Accordingly, the sealing ring, disposed between the base and the leading end of the releasing member, contacts the outer peripheral surface of the tube free from damage. As a result, it is possible to improve the sealing ability of the sealing ring.

In the case that the clamping member includes the claw which is disposed at axially opposite ends, respectively, each of the claws engage with the outer peripheral surface of the tube. Accordingly, an enhanced engaging force is exerted between the clamping member and the tube. Further, in the case that the clamping member, including the claw disposed at each of the axially opposite ends, is constructed so as to be substantially symmetrical with respect to a cross-sectional plane which contains a center of the clamping member in an axial direction thereof, it is possible to assemble the clamping member within the axial bore of the body by facing either of the axially opposite ends of the clamping member to the axial bore. As a result, it is possible to improve assembling of the clamping member in terms of operability.

In the case that the clamping member is made by drawing a plate blank to a tubular preform and thereafter by bending the tubular preform in a centripetal direction at an end, it is possible to manufacture the clamping member without employing time-consuming machining and without causing material loss, but with inexpensive manufacturing costs and with ease.

In the case that the releasing member further includes a first annular dust seal which is disposed on an inner peripheral surface of the base and which seals between the inner peripheral surface of the base and an outer peripheral surface of the tube, the first dust seal can prevent dust, dirt or the like from intruding and reaching the sealing ring by way of the outer peripheral surface of the tube in advance during the service of the present tube fitting. As a result, the first dust seal can contribute to further maintaining the function of the sealing ring.

In the case that the body further includes a second tubular dust seal which seals between the opening and an outer peripheral surface of the releasing member, the second dust seal can prevent dust, dirt or the like from intruding between the opening of the body and the outer peripheral surface of the releasing member during the service of the present tube fitting. As a result, the second dust seal can contribute to further maintaining the function of the sealing ring.

As having been described so far, in the present tube fitting, the inner pipe prevents the tube from deforming, e.g., bending or the like, which is associated with the flexibility of the tube. Accordingly, it is possible to reduce dust, dirt or the like which try to pass to the sealing ring by way of the interface between the releasing member, disposed at the trailing end of the body, and the tube. Consequently, the sealing ring can function properly for a long period of time. All in all, the present tube fitting enables maintaining the sealing function between itself and the tube for a prolonged period of time. Moreover, when disengaging the tube from the present tube fitting, the releasing member can be easily pushed into the inner side of the axial bore along the outer peripheral surface of the tube which is prevented from deforming by the the inner pipe. Hence, it is possible to improve the disengaging of the tube in terms of operability.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

First Preferred Embodiment

Figure 1:
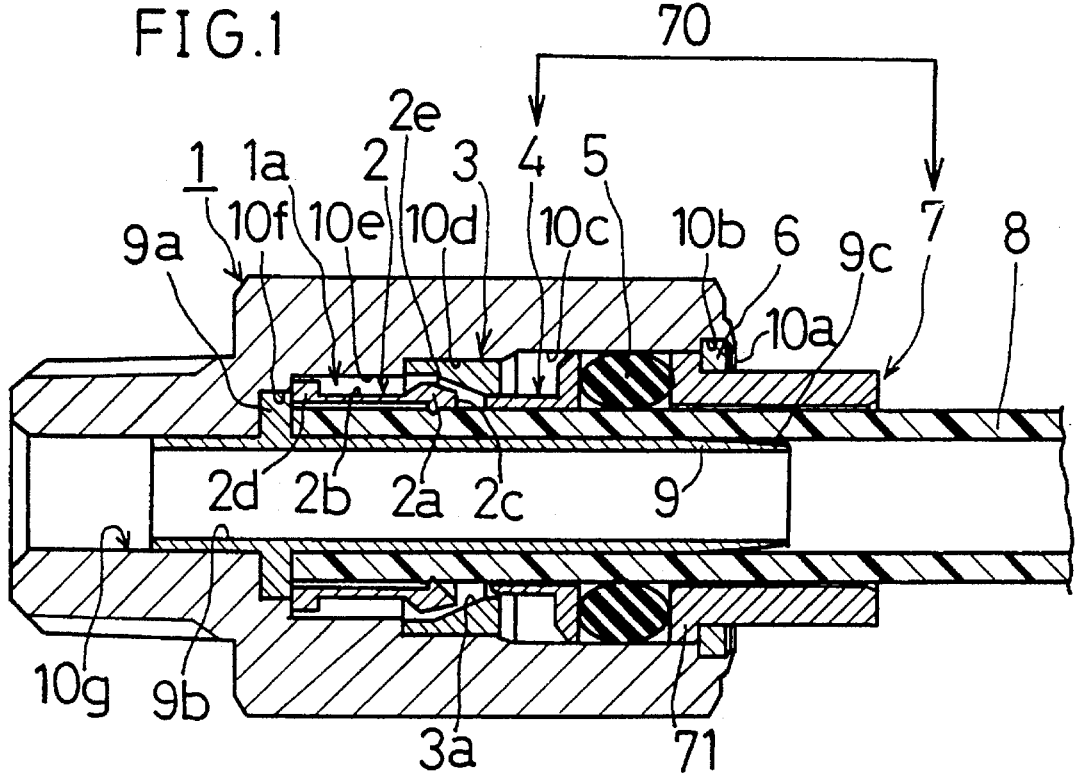
FIG. 1 is a cross-sectional view for illustrating the arrangements of a First Preferred Embodiment according to the present tube fitting.
Figure 2:
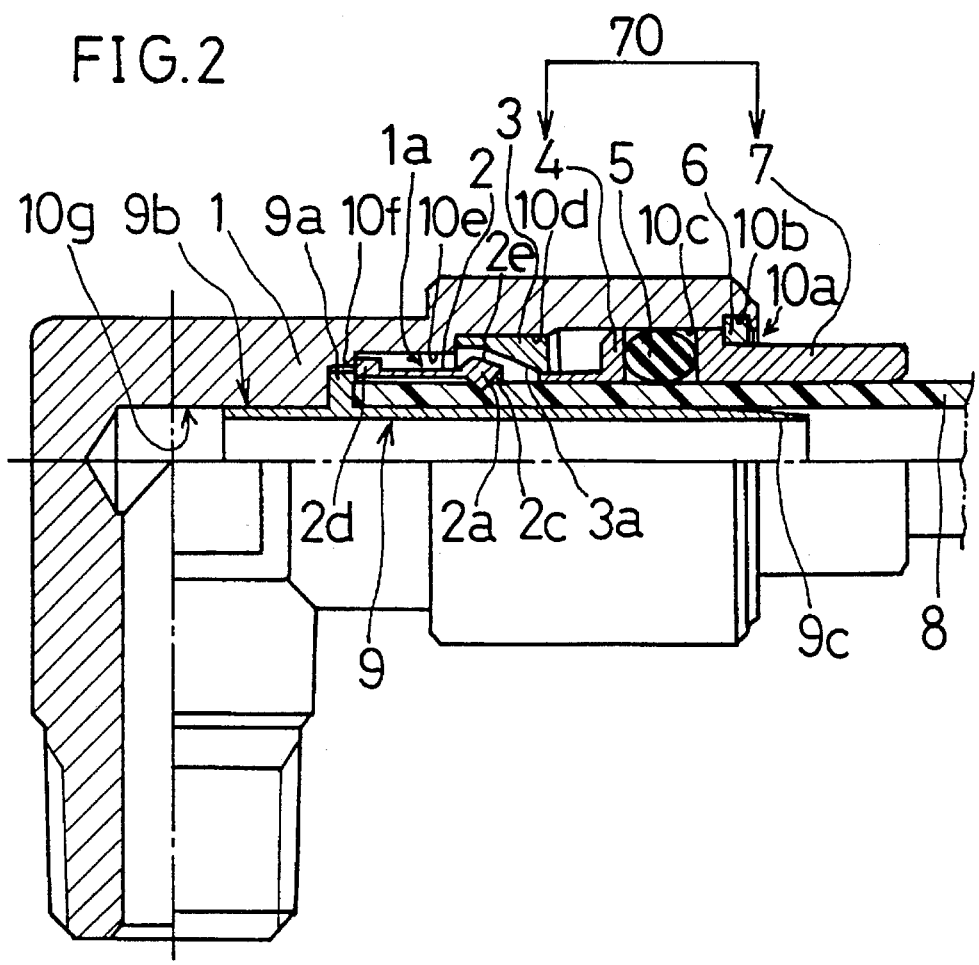
FIG. 2 is a cross-sectional view for illustrating the arrangements of a Second Preferred Embodiment according to the present tube fitting.

The First Preferred Embodiment according to the present tube fitting illustrated in FIG. 1 comprises a tubular body 1 made of brass, an annular clamping member 2 made of brass, an annular rib member 3 made of brass, a sealing ring 5, a tubular inner pipe 9 made of brass, and a releasing member 70.

The body 1 includes an axial bore 1a which extends from an opening 10a disposed at an axial end to the inner side and into which a tube 8 made of resin, such as nylon, is fitted. The axial bore 1a includes a plurality of inner peripheral surfaces. The inner peripheral surfaces have an inside diameter which differs from each other and which are gradually reduced stepwise from the opening 10a to the axially inner side. Namely, the axial bore 1a includes, from the opening 10a to the axially inner side, a first inner peripheral surface 10b, a second inner peripheral surface 10c, a third inner peripheral surface 10d, a fourth inner peripheral surface 10e, a fifth inner peripheral surface 10f, and a sixth inner peripheral surface 10g.

The inner pipe 9 is fixed in the axial bore 1a of the body 1. Specifically speaking, it is engaged with and fixed to the sixth inner peripheral surface 10g of the body 1 at a base end 9b thereof, and it is engaged with and fixed to the fifth inner peripheral surface 10f of the body 1 at a flange 9a thereof. The free end of the inner tube 9 is positioned so as to protrude from the opening 10a of the body 1, and it has a tapered free end surface 9c which extends in the centripetal direction as the free end approaches the body.

The clamping member 2 includes a tubular portion 2d which has an outside diameter smaller than the inside diameter of fourth inner peripheral surface 10e of the body 1 but which has an inside diameter larger than the outside diameter of the tube 8, and a plurality of arms 2b which extend in the axial direction integrally from the inner peripheral end of the tubular portion 2d. At the free end of the arms 2b, there is formed a claw 2a in a triangular form in cross-section which protrudes in the centripetal direction, which is tapered to a point, and which engages with the outer peripheral surface of the tube 8 fitted into the axial bore 1a via the opening 10a. On the side of the opening 10a, the inner peripheral surface or the claws 2a is formed in an inclined surface 2c which protrudes in the centripetal direction as the inclined surface extends away from the opening 10a. Thus, as the arms 2b are deformed elastically, each of the claws 2a of the clamping member 2 is made openable and closable or expandable and contractible in the radial direction. On the side of the free end, the outer peripheral surface of the arms 2b is made into an outer peripheral portion 2e which is brought into contact with a regulatory surface 3a of the rib member 3, later described, and which is accordingly pressed in the centripetal direction. As a result, the outer peripheral portions 2e are made to press the claws 2a against the outer peripheral surface of the tube 8. The clamping member 2 is positioned at the fourth inner peripheral surface 10e in the axial bore 1a of the body 1, and it is held movably in the axial direction. Here, the claws 2a of the clamping member 2 are positioned at the third inner peripheral surface 10d. The clamping member 2 thus constructed is made by machining a rod-shaped blank.

The rib member 3 is engaged with and fixed to the third inner peripheral surface 10d of the body 1. It includes a regulatory surface 3a which extends in the centripetal direction as regulatory surface approaches the opening 10a of the body 1 and which can contact with the outer peripheral portion 2e of the claws 2b of the clamping member 2.

The releasing member 70 is constructed so that the base and the leading end according to the present invention are members independent of each other. Namely, it includes a tubular base portion 7 operating as the present base, and a leading end portion a operating as the present leading end. Further, a sealing ring 5 (e.g., an O-ring or the like) is disposed between the base portion 7 and the leading end portion 4. The sealing ring 5 seals between the second inner peripheral surface 10c of the axial bore 1a and the outer peripheral surface of the tube 8 fixed in the axial bore 1a. The base portion 7 and the leading portion 4 constituting the releasing member 70, and the sealing ring 5 are held movably in the axial direction on the second inner peripheral surface 10c of the axial bore 1a of the body 1. The base portion 7 includes a flange 71 which is disposed at an axial end, which protrudes in the centrifugal direction and which has an outside diameter substantially identical with the inside diameter of the second inner peripheral surface 10c. When the flange 71 is brought into contact with an annular collar 6 which is made of brass and which is engaged with and fixed to the first inner peripheral surface 10b of the axial bore 1a, the base portion 7 is prevented from disengaging from the body 1. When the base portion 7 moves toward the inner side of the axial bore 1a of the body 1, the leading end portion 4 moves to the inner side together with the sealing ring 5. The leading end portion 4 is made so that its leading end can go beyond the regulatory surface 3a of the rib member 3, and it can enter between the inclined surface 2c of the claws 2a of the clamping member 2 and the outer peripheral surface of the tube 8. The inside diameter of the base portion 7 and the leading end portion 4 is designed to be slightly larger than the outside diameter of the tube 8. The inside diameter of the sealing ring 5 is designed to be slightly smaller than the outside diameter of the tube 8, and the outside diameter thereof is designed to be slightly larger than the inside diameter of the second inner peripheral surface 10c of the axial bore 1a.

The First Preferred Embodiment is assembled as follows. First, the inner pipe 9 is engaged with and fixed to the fifth inner peripheral surface 10f and the six inner peripheral surface 10g of the axial bore 1a of the body 1. Thereafter, the clamping member 2 is fitted into the fourth inner peripheral surface 10e thereof. Then, the rib member 3 is engaged with and fixed to the second inner peripheral surface 10c thereof, and the leading end portion 4, the sealing ring 5 and the base portion 7 are fitted into the second inner peripheral surface 10c in this order. Moreover, the collar 6 is engaged with the first inner peripheral surface 10b thereof. Finally, the open end of the body 1 is crimped in the centripetal direction in order to fix the collar 6 to the first inner peripheral surface 10b, thereby completing the First Preferred Embodiment.

As hereinafter described, the tube 8 is fixed to the present tube Fitting thus constructed. First, an end of the tube 8 is fitted into the body 1 via the opening 10a. During the fitting, the tube 8 is fitted into the space between the inner peripheral surface of the base portion 7 of the releasing member 7 and the outer peripheral surface of the inner tube 9. Since the tapered free end surface 9c is formed at the free end of the inner tube 9, and since the tapered Free end surface 9c guides the leading end of the tube 8, the tube 8 can be fitted into the space with ease. The tube 8 is fitted into the axial bore 1a of the body 1 until its leading end is brought into contact with the flange 9a of the inner pipe 9. Thereafter, the tube 8 is pulled back slightly in the direction opposite to the fitting direction. With this operation, the claws 2a of the clamping member 2 are fastened with the outer peripheral surface of the tube 8. Accordingly, the clamping member 2 is pulled back in the opposite direction along with the tube 8. Then, the outer peripheral portion 2e of the arms 2b is brought into contact with the regulatory surface 3a of the rib member 3, and it is pressed in the centripetal direction. As a result, as the arms 2b of the clamping member 2 are deformed elastically, each of the claws 2a thereof is pressed onto the outer peripheral surface of the tube 8, thereby pinching and engaging with the tube 8. At this moment, the inner tube 9 is present on the inner peripheral side of the tube 8, and it prevents the tube 8 from deforming in the centripetal direction. Consequently, each of the claws 2a of the clamping member 2 pinches and securely engages with the tube 8. Thus, the tube 8 can be firmly fixed to the present tube fitting. When the tube 8 goes over the claws 2a of the clamping member 2, there are deformations extending in the axial direction on the outer peripheral surface of the tube 8. However, in the First Preferred Embodiment, since the sealing ring 5 is disposed between the base portion 7 and the leading end portion 4 of the releasing member 70, and since the outer peripheral surface of the tube 8 is not damaged by the claws 2a of the clamping member 2 where it is brought into contact with the sealing ring 5, it is possible to reliably seal with the sealing ring 5.

In the First Preferred Embodiment, when the tube 8 is fitted into the axial bore 1a of the body 8 and fixed thereto by the clamping member 2, the inner pipe 9 is present on the inner peripheral side of the tube 8, and the free end of the inner tube 9 is positioned so as to protrude from the opening 10a of the body 1. Accordingly, adjacent to the opening 10a of the body 1, the inner tube 9 can securely prevent the tube 8 from deforming, such as by bending, flattening or the like, which is associated with the flexibility of the tube 8. Accordingly, a space is less likely to form between the base portion 7 of the releasing member 7, disposed around the opening 10a of the body 1, and the tube 8 where dust, dirt or the like try to intrude. Consequently, it is possible to reduce dust, dirt or the like which intrude to the sealing ring 5. All in all, in the First Preferred Embodiment, it is possible to maintain the sealing function of the sealing ring 5 for a long period of time.

The tube 8 is disengaged from the present tube fitting as follows. First, the base portion 7 of the releasing member 70 is pressed to the inner side of the axial bore 1a of the body With this operation, the leading end portion 4 of the releasing member 70 is pushed into the inner side together with the sealing ring 5. The front end of the leading end portion 4 travels over the regulatory surface 3a of the rib member 3, and goes between the inclined surface 2c of the claws 2a of the clamping member 2 and the outer peripheral surface of the tube 8. Then, the front end of the leading end portion 4 contacts with the inclined surface 2c of the claws 2, and urges the inclined surfaces 2c to the inner side of the axial bore 1a and in the centrifugal direction. Accordingly, the clamping member 2 moves to the inner side of the axial bore 1a, and simultaneously the claws 2a move in the centrifugal direction as the arms 2a deform elastically. Finally, the claws 2a leave from the outer peripheral surface of the tube 8. Consequently, the tube 8 is released from the clamping member 2, and can be pulled out of the axial bore 1a of the body 1.

In the First Preferred Embodiment, with the aforementioned simple operation, for instance, by pulling out the tube 8 after pressing the base portion 7 of the releasing member 70 into the inner side of the axial bore 1a of the body 1, it is possible to remove the tube 8 from the present tube fitting with ease. In addition, since the inner pipe 9 inhibits the tube 8 from deforming, the releasing member 70 can be easily pushed into the inner side of the axial bore 1a along the outer peripheral surface of the tube 8. Hence, the operability can be improved during the removing operation.

Second Preferred Embodiment

The Second Preferred Embodiment according to the present tube fitting is an application of the present invention to an elbow-shaped tube fitting. Namely, in the Second Preferred Embodiment, the body 1 is bent in a letter "L" shape at an end opposite to the opening 10a. Other than this construction, the Second Preferred Embodiment is arranged identically with those of the First Preferred Embodiment described above, and it operates and produces advantageous effects similarly thereto.

Third Preferred Embodiment

Figure 3:
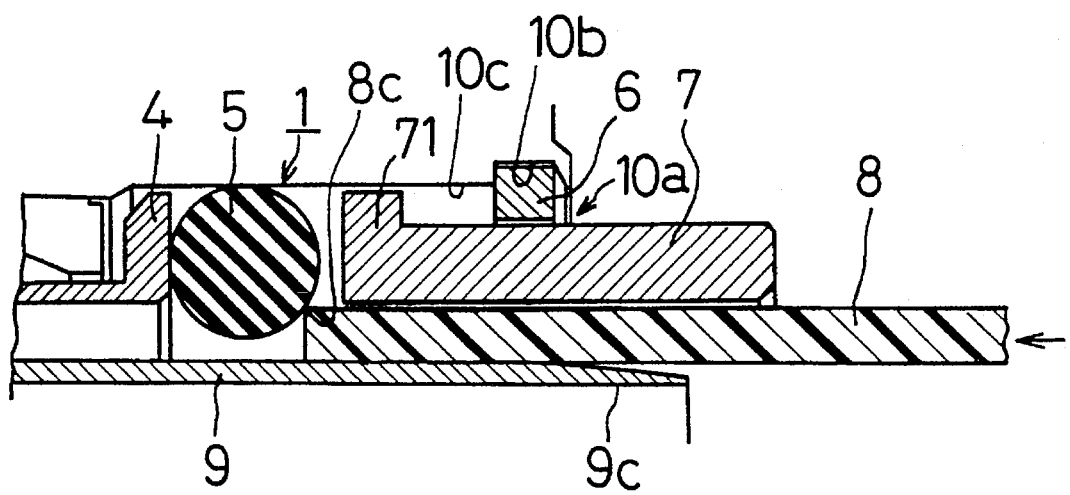
FIG. 3 is a partially enlarged cross-sectional view of the First Preferred Embodiment according to the present tube fitting.

As illustrated in FIG. 3, and in the First and Second Preferred Embodiments described above, since the inside diameter of the sealing 5 is smaller than the inside diameter of the base portion 7, the tube 8 collides with the sealing ring 5 at an edge corner 8c of the leading end thereof. Accordingly, when keeping the tube 8 being pushed to the inner side of the axial bore 1a, the tube 8 might damage the inner peripheral surface of the sealing ring 5. Consequently, the sealing ring 5 might exhibit a deteriorated sealing property.

Figure 4:
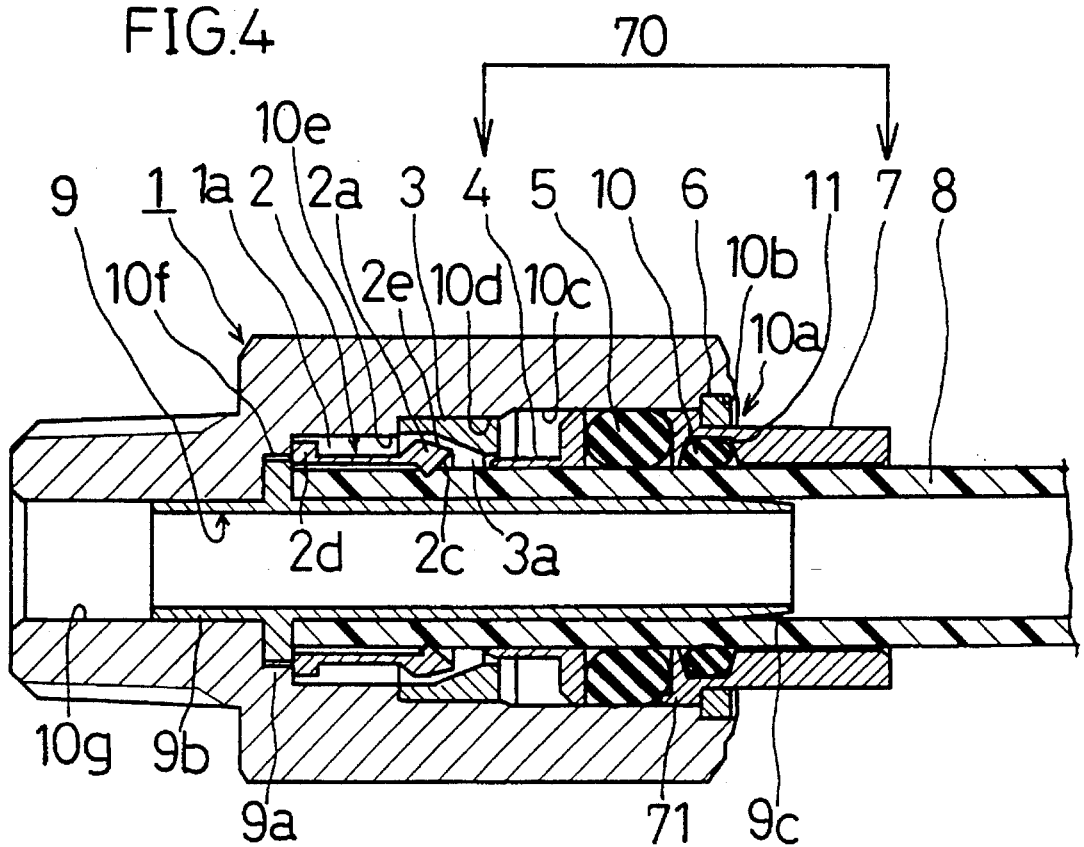
FIG. 4 is a cross-sectional view For illustrating the arrangements of a Third Preferred Embodiment according to the present tube fitting.
Figure 5:
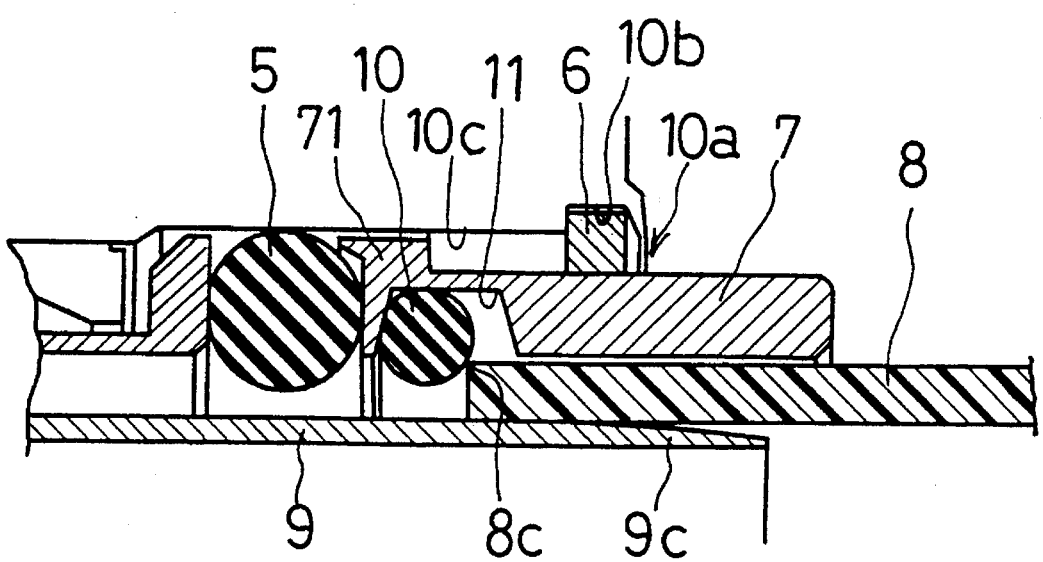
FIG. 5 is a partially enlarged cross-sectional view of the Third Preferred Embodiment according to the present tube fitting.
Figure 6:
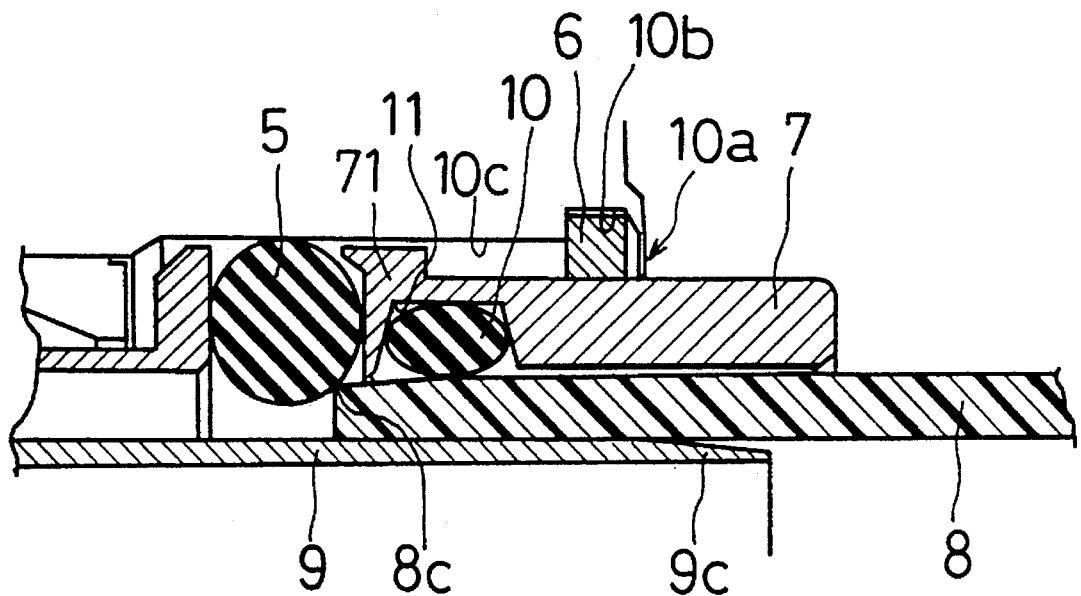
FIG. 6 is a partially enlarged cross-sectional view of the Third Preferred Embodiment according to the present tube fitting.

The Third Preferred Embodiment according to the present tube fitting illustrated in FIGS. 4 through 6 is provided with a first dust seal 10, operating as an auxiliary sealing ring, on the inner peripheral surface of the base portion 7 of the releasing member 70. Namely, in the inner peripheral surface of the base portion 7 adjacent to the flange 71, there is formed an annular groove 11 which has an axial length larger than the diameter of the cross-section of the first dust seal 10 (i.e., thickness thereof) and in which the first dust seal 10 is accommodated. Other than these constructions, the Third Preferred Embodiment is arranged identically with those of the First Preferred Embodiment described above. Hence, in addition to the operations and advantageous effects of the First Preferred Embodiment, the Third Preferred Embodiment operates and produces advantageous extra effects as hereinafter described.

As can be seen From FIG. 5, in the Third Preferred Embodiment, the tube 8, Fitted between the inner pipe 9 and the base portion 7, first collides with the inner peripheral surface of the first dust seal 10 at the edge corner 8c of the leading end. When the tube 8 is kept being pushed to the inner side of the axial bore 1a, the first dust seal 10 deforms. However, during the operation, since the first dust seal 10 deforms in the axial direction within the annular groove 11 so as not to interfere with the tube 8, it is little damaged on the inner peripheral surface. At the same time, the first dust seal 10 presses the edge corner 8c of the leading end of the tube 8 in the centripetal direction, thereby contracting the tube 8 at the leading end. As a result, it is possible to inhibit the edge corner 8c of the leading end of the tube 8 from colliding with and damaging the sealing ring 5. Moreover, the first dust seal 10 can prevent dust, dirt or the like, which adhere on the tube 8, from intruding during the fitting of the tube 8, and it can further inhibit dust, dirt or the like from invading by way of the outer peripheral surface of the tube 8 during the service of the present tube fitting. As a result, it is possible to maintain the sealing function of the sealing ring 5 for an extremely prolonged period of time.

Fourth Preferred Embodiment

Figure 7:
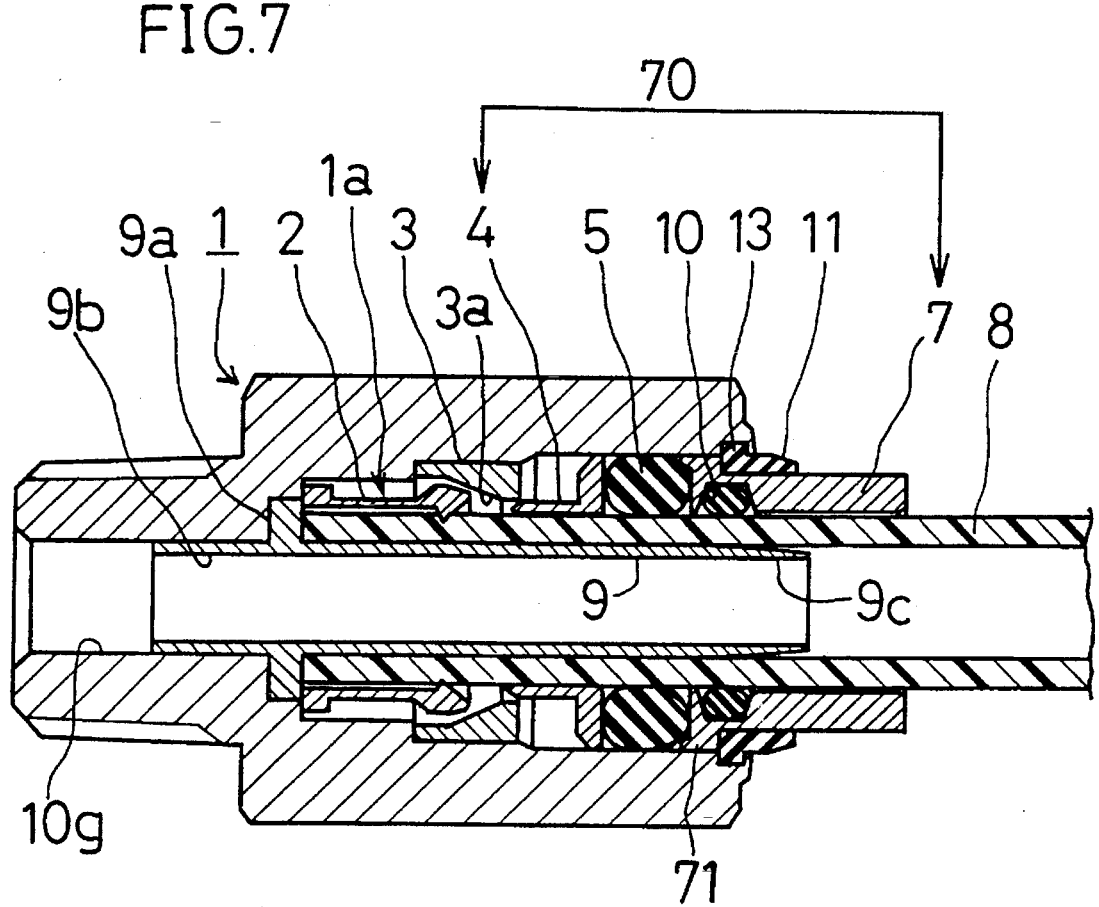
FIG. 7 is a cross-sectional view for illustrating the arrangements of a Fourth Preferred Embodiment according to the present tube fitting.
Figure 8:
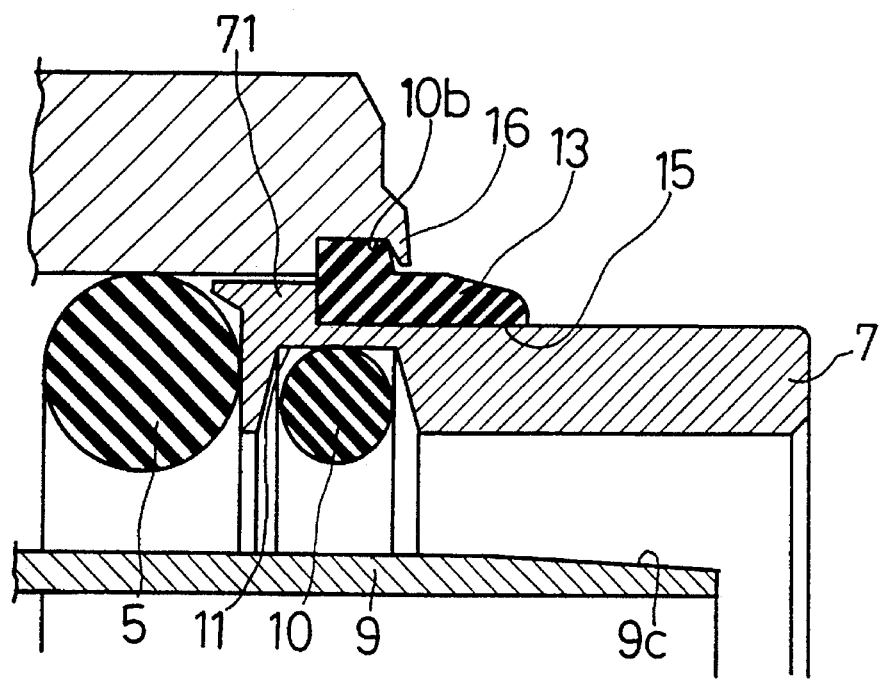
FIG. 8 is a partially enlarged cross-sectional view of the Fourth Preferred Embodiment according to the present tube fitting.
Figure 9:
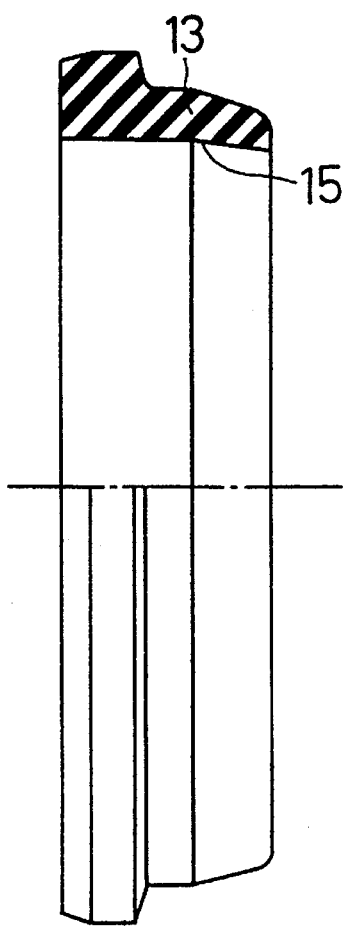
FIG. 9 is an enlarged side view, partially in cross-section, for illustrating the second dust seal of the Fourth Preferred Embodiment according to the present tube fitting.

In the Fourth Preferred Embodiment according to the present tube fitting illustrated in FIGS. 7 through 9, instead of the collar 6 provided in the Third Preferred Embodiment described above, a second dust seal 13 is provided between the opening 10a of the body 1 and the outer peripheral surface of the base portion 7 of the releasing member 70.

The second dust seal 13 is engaged with and fixed to the first inner peripheral surface 10b of the body 1 at the base end. On the side of the free end of the seal 13, the inner peripheral surface is provided with a tapered surface 15 which extends in the centripetal direction as the free end comes near. Other than this construction, the Fourth Preferred Embodiment is arranged identically with those of the Third Preferred Embodiment described above. Hence, the Fourth Preferred Embodiment can inhibit dust, dirt or the like from intruding between the opening 10a of the body 1 and the base portion 7 of the releasing member 70. As a result, the Fourth Preferred Embodiment can maintain the sealing function of the sealing ring 5 much longer than the Third Preferred Embodiment can.

Fifth Preferred Embodiment

Figure 10:
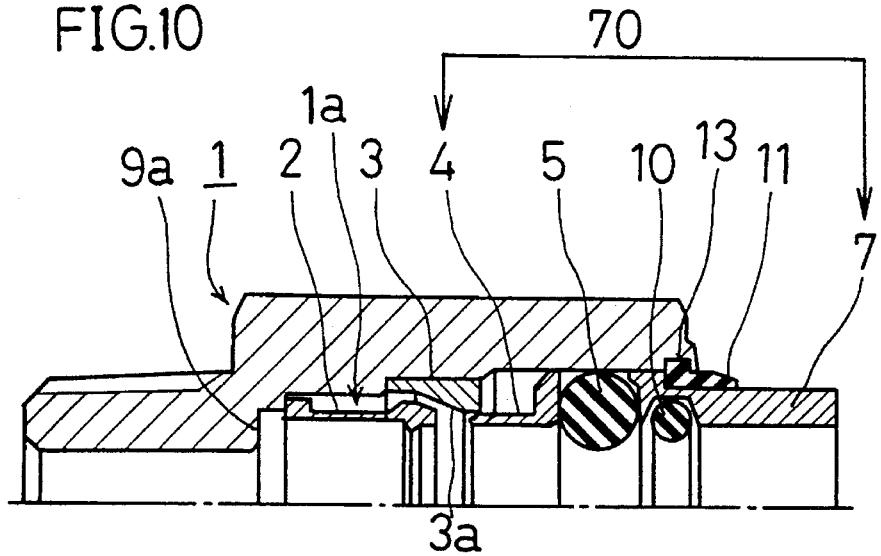
FIG. 10 is a cross-sectional view for illustrating the arrangements of a Fifth Preferred Embodiment according to the present tube fitting.
Figure 11:
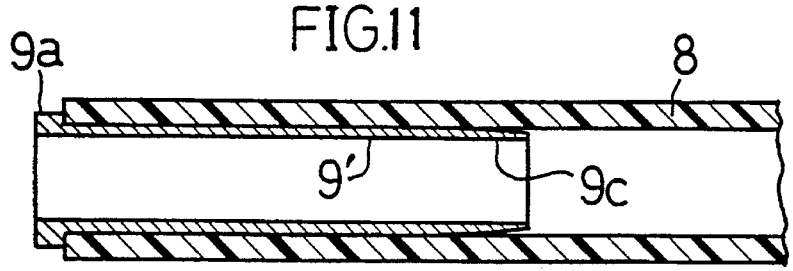
FIG. 11 is a cross-sectional view of the Fifth Preferred Embodiment according to the present tube fitting, which illustrates the fitting of the inner pipe into the tube.
Figure 12:
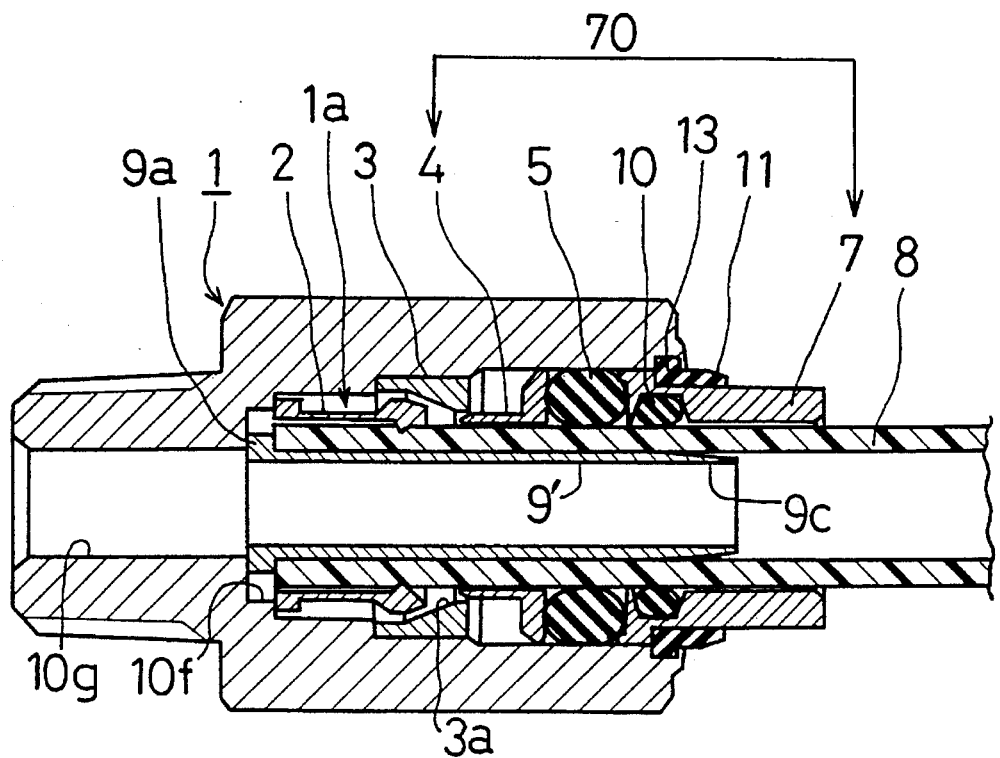
FIG. 12 is a cross-sectional view of the Fifth Preferred Embodiment according to the present tube fitting, which illustrates the fitting of the tube into the axial bore.

In the Fifth Preferred Embodiment according to the present tube fitting illustrated in FIGS. 10 through 12, the inner pipe 9 is separated from the body 1 whereas it is fixed thereto in the Fourth Preferred Embodiment. Other than this construction, the Fifth Preferred Embodiment is arranged identically with those of the Fourth Preferred Embodiment described above. Further, this inner pipe 9 is formed as follows. Namely, it obviates the base end 9b of the inner pipe 9 of the Fourth Preferred Embodiment, and it has the flange 9a whose outside diameter is smaller than the outside diameter of the tube 8.

In the Fifth Preferred Embodiment, the inner pipe 9 is fitted into the tube 8, and thereafter the tube 8 with the inner pipe 9 assembled is fitted into the axial bore 1a of the body 1. Accordingly, during the fitting of the tube 8 into the axial bore 1a of the body 1, the inner pipe 9 can inhibit the tube 8 from deforming which results from the flexibility of the tube 8. Consequently, it is possible to quickly and securely fit the tube 8 into the axial bore 1a. As a result, it is possible to improve the fitting of the tube 8 in terms of operability.

Sixth Preferred Embodiment

Figure 13:
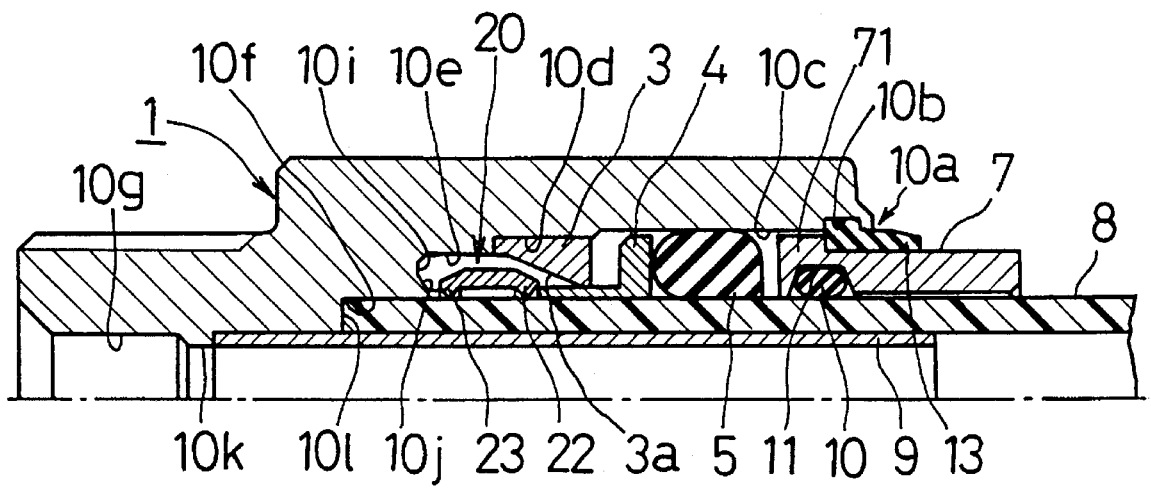
FIG. 13 is a partial cross-sectional view for illustrating the arrangements of a Sixth Preferred Embodiment according to the present tube fitting.
Figure 14:
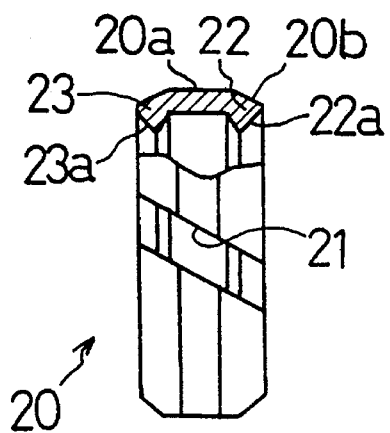
FIG. 14 is a side view, partially in cross-section, for illustrating the clamping member of the Sixth Preferred Embodiment according to the present tube fitting.
Figure 15:
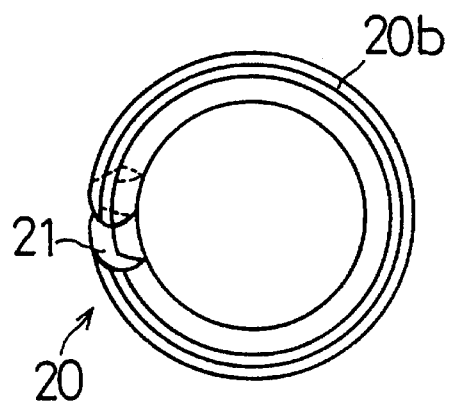
FIG. 15 is a perspective view for illustrating the clamping member of the Sixth Preferred Embodiment according to the present tube fitting.

In the Sixth Preferred Embodiment according to the present tube fitting illustrated in FIGS. 13 through 15, the body 1 includes a plurality of inner peripheral surfaces which have an inside diameter differing from each other and reducing stepwise gradually from the opening 10a to the axially inner side. Namely, the body 1 includes, from the opening 10a to the axially inner side, a first inner peripheral surface 10b, a second inner peripheral surface 10c, a third inner peripheral surface 10d, a fourth inner peripheral surface 10e, a fifth inner peripheral surface 10f, and a sixth inner peripheral surface 10g. Further, there is formed a tapered projection 10j at a stepped portion 10i between the fourth inner peripheral surface 10e and the fifth inner peripheral surface 10f. The tapered projection 10j extends in the centripetal direction as the opening 10a comes near. Furthermore, there is formed a projection 10k on the sixth inner peripheral surface 10g. The projection 10k projects in the centripetal direction, and it contacts with an end of the tubular inner pipe 9 which is free from the flange 9a and which is engaged with and fixed to the sixth inner peripheral surface 10f.

In this Sixth Preferred Embodiment, a clamping member 20 is held movably on the inner side with respect to the rib member 3 which is engaged with and fixed to the third inner peripheral surface 10d. As illustrated in FIGS. 14 and 15, this clamping member 20 has a cut-off 21 which is inclined over the full length from one end to the other end in the axial direction, and it is formed in a tubular shape which has a letter "C" shape cross-section, which exhibits spring elasticity enabling it to diametrically expand and contract. Further, the clamping member 20 includes a first claw 22 disposed at an axial end (e.g., on the side of the opening 10a of the axial bore 1a), and a second claw 23 disposed at an opposite axial end (e.g., on the inner side of the axial bore 1a). The first claw 22 protrudes from the inner peripheral surface in the centripetal direction in a triangular form in cross-section which is tapered to a point, and extends in the circumferential direction. Likewise, the second claw 23 protrudes from the inner peripheral surface in the centripetal direction in a triangular form in cross-section which is tapered to a point, and extends in the circumferential direction. Furthermore, on the side of the opening 10a, the inner peripheral surface of the first claw 22 is formed in a first inclined surface 22a which protrudes in the centripetal direction as the opening 10a goes away. Moreover, on the inner side of the axial bore 1a, the inner peripheral surface of the second claw 23 is formed in a second inclined surface 23a which protrudes in the centripetal direction as the second inclined surface approaches the opening 10a. In addition, the outer peripheral surface of the clamping member 20 is formed in the following manner. At the intermediate portion, there is formed a central outer peripheral surface 20a which is formed flatly. On the outer peripheral surface disposed at an axial end (e.g., on the side of the opening 10 of the axial bore 1a), there is formed an outer peripheral portion 20b which extends in the centripetal direction as the other peripheral portion approaches the opening 10a comes near and which is brought into contact with and pressed by the regulatory surface 3a of the rib member 3. On the outer peripheral surface disposed at an opposite axial end (e.g., on the inner side of the axial bore 1a), there is formed an outer peripheral surface which extends in the centripetal direction as the outer peripheral surface extends away from the opening 10a goes. Thus, the clamping member 20 is constructed so as to be symmetrical with respect to a cross-sectional plane which contains the center of the clamping member 20 in the axial direction.

Other than these constructions, the Sixth Preferred Embodiment is arranged identically with that of the Fourth Preferred Embodiment described above.

In the Sixth Preferred Embodiment, the tube 8 is fixed to the tube fitting thus constructed in the following manner. First, an end of the tube 8 is fitted into the axial bore 1a until it is brought into contact with the stepped portion 10l disposed between the fifth inner peripheral surface 10f and the six inner peripheral surface 10g. Thereafter, the tube 8 is pulled back slightly in the direction opposite to the fitting direction. With this operation, the first claw 22 and the second claw 23 of the clamping member 20 are fastened with the outer peripheral surface of the tube 8. Accordingly, the clamping member 20 is pulled back in the opposite direction along with the tube 8. Then, the outer peripheral portion 20a of the clamping member 20 is brought into contact with the regulatory surface 3a of the rib member 3, and it is pressed in the centripetal direction. As a result, the clamping member 20 is contracted diametrically, and the first claw 22 and the second claw 23 are pressed onto the outer peripheral surface of the tube 8, thereby pinching and engaging with the tube 8.

When disengaging the tube 8 from the present tube fitting, the base portion 7 of the releasing member 70 is pressed to the inner side of the axial bore 1a of the body 1 manually.

With this operation, the leading end portion 4 of the releasing member 70 is brought into contact with the first inclined surface 22a of the first claw 22, thereby urging the inclined surface 22a to the inner side of the axial bore 1a and in the centrifugal direction. Accordingly, the clamping member 20 is moved to the inner side of the axial bore 1a, and the second inclined surface 23a of the second claw 23 is pressed and urged by the tapered projection 10j in the centrifugal direction. Consequently, the clamping member 20 is expanded diametrically, and the first claw 22 and the second claw 23 are disengaged from the outer peripheral surface of the tube 8. As a result, the tube 8 is released from the clamping member 20, and it can be pulled out of the axial bore 1a of the body 1.

In the Sixth Preferred Embodiment, the clamping member 20 includes the first claw 22 and the second claw 23 at the axially opposite ends, respectively. The first claw 22 and the second claw 23 engage with the outer peripheral surface of the tube 8. Accordingly, an enhanced engaging force can be exerted between the clamping member 20 and the tube 8. Moreover, the clamping member 20 is constructed so as to be symmetrical with respect to a cross-sectional plane which contains the center of the clamping member 20 in the axial direction. Consequently, when assembling the clamping member 20 within the axial bore 1a of the body 1, the clamping member 20 can be assembled within the axial bore 1a by facing either of the axially opposite ends to the bore 1a. As a result, the assembly can be improved in terms of operability.

Seventh Preferred Embodiment

Figure 16:
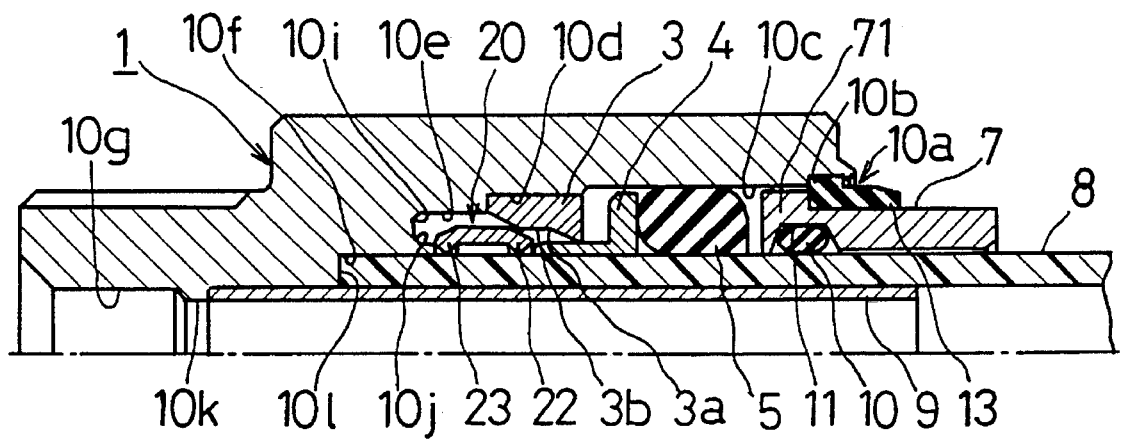
FIG. 16 is a partial cross-sectional view for illustrating the arrangements of a Seventh Preferred Embodiment according to the present tube fitting.
Figure 17:
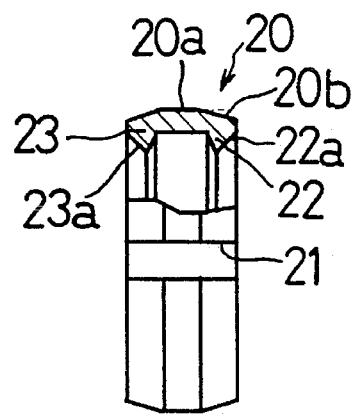
FIG. 17 is a side view, partially in cross-section, for illustrating the clamping member of the Seventh Preferred Embodiment according to the present tube fitting.
Figure 18:
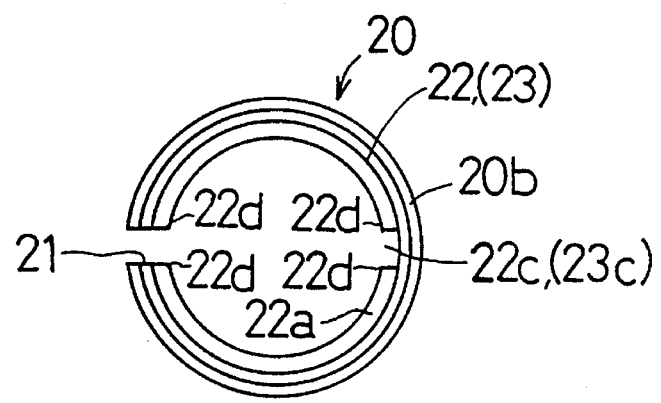
FIG. 18 is a front view for illustrating the clamping member of the Seventh Preferred Embodiment according to the present tube fitting.

The Seventh Preferred Embodiment according to the present tube fitting illustrated in FIGS. 16 through 18 comprises a configurationally modified version of the clamping member 20 and the rib member 3 of the Sixth Preferred Embodiment. Other than this modification, the Seventh Preferred Embodiment is arranged identically with that of the Sixth Preferred Embodiment described above.

As illustrated in FIGS. 17 and 18, instead of the inclined cut-off 27 of the clamping member 20 of the Sixth Preferred Embodiment, the clamping member 20 of the Seventh Preferred Embodiment is provided with a non-inclined cut-off 21. Moreover, the first and second claws 22 and 23 are provided with cut-offs 22c and 23c, respectively. Except for these constructions, the clamping member 20 is constructed similarly to those of the clamping member 20 of the Sixth Preferred Embodiment described above.

As illustrated in FIG. 16, the rib member 3 of the Seventh Preferred Embodiment is further provided with a flat platform 3b disposed at an intermediate portion of the inclined surface 3a. The flat platform 3b has an inside diameter smaller than the outside diameter of the central outer peripheral surface 20a of the clamping member 20. Except for this construction, the rib member 3 is constructed similarly to that of the rib member 3 of the Sixth Preferred Embodiment described above.

In the Seventh Preferred Embodiment, when the tube 8 is fixed in the axial bore 1a, the outer peripheral portion 20b of the clamping member 20 is pressed in the centripetal direction by the inclined surface 3a of the rib member 3, and at the same time the central outer peripheral surface 20a is pressed securely in the centripetal direction by the flat platform 3b of the rib member 3. At the same time, the first claw 22 pinches the tube 8 mainly at the Four edges 22d disposed in the circumferential direction. Similarly, the second claw 23 pinches the tube 8 mainly at the four edges disposed in the circumferential direction. Accordingly, compared with the clamping member 20 of the Sixth Preferred Embodiment which is provided with the claws 22 and 23 having only two edges in the circumferential direction, the engaging force exerted between the first claw 22 and the second claw 23 of the clamping member 20 and the tube 8 can be further enhanced.

Eighth Preferred Embodiment

Figure 19:
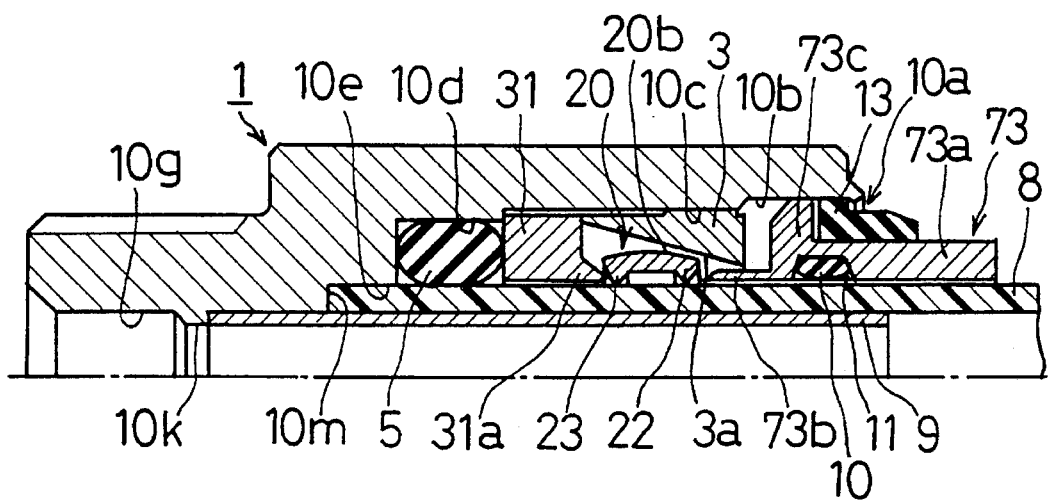
FIG. 19 is a partial cross-sectional view for illustrating the arrangements of an Eighth Preferred Embodiment according to the present tube fitting.

In the Eighth Preferred Embodiment according to the present tube fitting illustrated in FIG. 19, the body 1 includes a plurality of inner peripheral surfaces which have an inside diameter differing from each other and reducing stepwise gradually from the opening 10a to the axially inner side. Namely, the body 1 includes, from the opening 10a to the axially inner side, a First inner peripheral surface 10b, a second inner peripheral surface 10c, a third inner peripheral surface 10d, a fourth inner peripheral surface 10e, and a fifth inner peripheral surface 10f. A projection 10k projecting in the centripetal direction is disposed on the fifth inner peripheral surface 10f, and contacts with an end of the tubular inner pipe 9 which is free from the flange 9a and which is engaged with and fixed to the fifth inner peripheral surface 10f. Further, the sealing ring 5 is held on the third inner peripheral surface 10d. Furthermore, a first rib member 3 and a second rib member 31 are engaged with and fixed to the second inner peripheral surface 10c. On the opening 10a side of the end surface of the second rib member 31, there is formed a tapered projection 31a which extends in the centripetal direction as tapered projection approaches the opening 10a. Moreover, a releasing member 73 is held movably in the axial direction on the first inner peripheral surface 10b, and the second dust seal 13 is engaged with and disposed on the first inner peripheral surface 10b.

As can be seen from FIG. 19, in the Eighth Preferred Embodiment, the releasing member 73 is constructed so as to integrate the base and the leading end according to the present invention. Namely, it includes a thick tubular base 73a operating as the present base, and a thin tubular leading end 73b operating as the present leading end. Further, the base 73a of the releasing member 73 has a flange 73c at an axial end, flange 73c which extends in the centrifugal direction and which has an outside diameter substantially equal to the inside diameter of the first inner peripheral surface 10b. Furthermore, in the inner peripheral surface of the base 73a adjacent to the flange 73c, there is formed an annular groove 11 which has an axial length larger than the thickness of the first dust seal 10 and in which the first dust seal 10 is accommodated. Moreover, when the releasing member 73 is moved to the inner side of the axial bore 1a of the body 1, the leading end 73b of the releasing member 73 is constructed so that it can enter between the first inclined surface 22a of the first claw 22 of the clamping member 2 and the outer peripheral surface of the tube 8.

As illustrated in FIG. 19, instead of the tapered configuration at the axial ends of the clamping member 20 of the Sixth Preferred Embodiment, the clamping member 20 of the Eighth Preferred Embodiment is formed in an arc shape, on the outer peripheral surface. Other than this construction, it is arranged identically with that of the clamping member 20 of the Sixth Preferred Embodiment. Accordingly, on the side of the opening 10a, the outer peripheral surface of the clamping member 20 is constructed so as to operate as an outer peripheral portion 20b which is pressed in the centripetal direction by the regulatory surface 3a of the first rib member 3.

The Eighth Preferred Embodiment thus constructed is assembled with the tube 8 in the following manner. First, an end of the tube 8 is fitted into the axial bore 1a until it is brought into contact with the stepped portion 10m disposed between the fourth inner peripheral surface 10e and the fifth inner peripheral surface 10f. Thereafter, the tube 8 is pulled back slightly in the direction opposite to the fitting direction. With this operation, the first claw 22 and the second claw 23 of the clamping member 20 are fastened with the outer peripheral surface of the tube 8. Accordingly, the clamping member 20 is pulled back in the opposite direction along with the tube 8. Then, the outer peripheral portion 20b of the clamping member 20 is brought into contact with the regulatory surface 3a of the first rib member 3, and it is pressed in the centripetal direction. As a result, the clamping member 20 is contracted diametrically, and the first claw 22 and the second claw 23 are pressed onto the outer peripheral surface of the tube 8, thereby pinching and engaging with the tube 8.

When disengaging the tube 8 from the present tube fitting, the base 73a of the releasing member 73 is pressed to the inner side of the axial bore 1a of the body 1 manually with a hand or fingers. With this operation, the leading end 73b of the releasing member 73 is brought into contact with the first inclined surface 22a of the first claw 22, thereby urging the inclined surface 22a to the inner side of the axial bore 1a and in the centrifugal direction. Accordingly, the clamping member 20 is moved to the inner side of the axial bore 1a, and the second inclined surface 23e of the second claw 23 of the clamping member 20 is pressed and urged by the tapered projection 31a of the second rib member 31. Consequently, the clamping member 20 is expanded diametrically, and the first claw 22 and the second claw 23 are disengaged from the outer peripheral surface of the tube 8. As a result, the tube 8 is released from the clamping member 20, and it can be pulled out of the axial bore 1a of the body 1.

Ninth Preferred Embodiment

Figure 20:
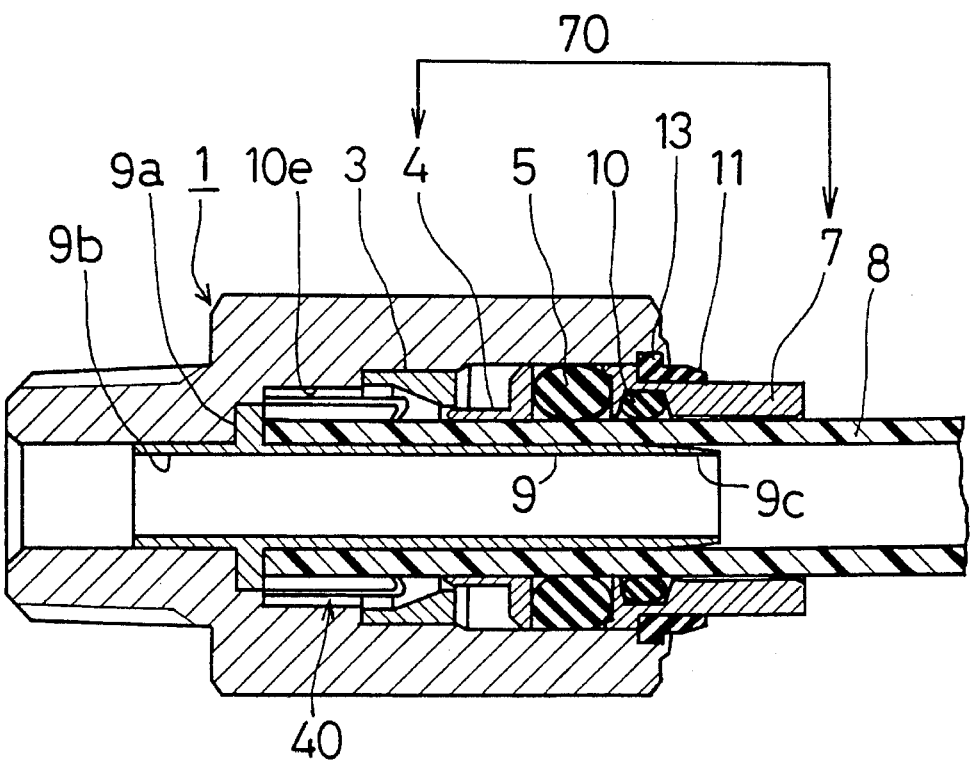
FIG. 20 is a cross-sectional view for illustrating the arrangements of a Ninth Preferred Embodiment according to the present tube fitting.
Figure 21:
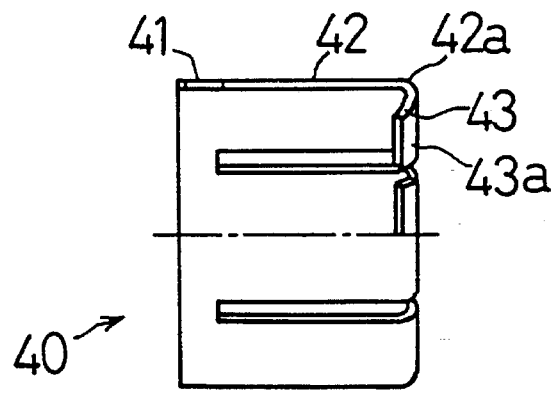
FIG. 21 is a side view, partially in cross-section, for illustrating the clamping member of the Ninth Preferred Embodiment according to the present tube fitting.
Figure 22:
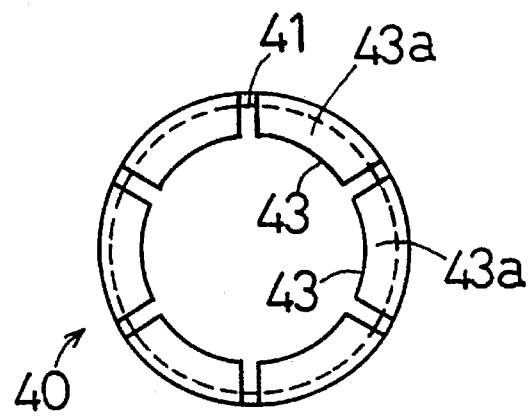
FIG. 22 is a front view for illustrating the clamping member of the Ninth Preferred Embodiment according to the present tube fitting.

In the Ninth Preferred Embodiment according to the present tube fitting illustrated in FIGS. 20 through 22, a clamping member 40 is formed by drawing. Other than this modification, the Ninth Preferred Embodiment is arranged identically with that of the Fourth Preferred Embodiment.

For instance, the clamping member 40 of the Ninth Preferred Embodiment is made as follows. First, a plate-shaped blank having a plurality of slits is drawn to a tubular preform. Then, the tubular preform is bent in the centripetal direction at an axial end so as to form a plurality of claws 43 later described.

As can be appreciated from FIGS. 21 and 22, the clamping member 40 includes a tubular portion 41 which, as best shown in FIG. 20, has an outside diameter smaller than the inside diameter of the fourth inner peripheral surface 10e of the body 1 but which has an inside diameter larger than the outside diameter of the tube 8, and a plurality of arms 42 which extend in the axial direction integrally from the inner peripheral end of the tubular portion 41. At the free end of the arms 42, there is formed a claw 43 which is made by bending in the centripetal direction. On the side of the opening 10a, the inner peripheral surface of the claws 43 is made into an inclined surface 43a which protrudes in the centripetal direction as the inclined surface extends away from the opening 10a. Thus, as the arms 42 are deformed elastically, each of the claws 43 of the clamping member 40 is made operable and closable or expandable and contractible in the radial direction. On the free end side of the arms 42, the outer peripheral surface of the arms 42 is made into an outer peripheral portion 42a which is brought into contact with the regulatory surface 3a of the rib member 3, and which is accordingly pressed in the centripetal direction so as to press the bent portion of the claws 43 onto the outer peripheral surface of the tube 8.

The Ninth Preferred Embodiment operates and produces advantageous effects similar to the Fourth Preferred Embodiment described above. In addition, in the Ninth Preferred Embodiment, since the clamping member 40 is made by drawing a plate-shaped blank to a tubular preform and thereafter by bending the tubular preform in a centripetal direction at an end, the clamping member can be manufactured without employing time-consuming machining and without causing material loss. Accordingly, it can be manufactured with inexpensive manufacturing costs and with ease.

Tenth Preferred Embodiment

Figure 23:
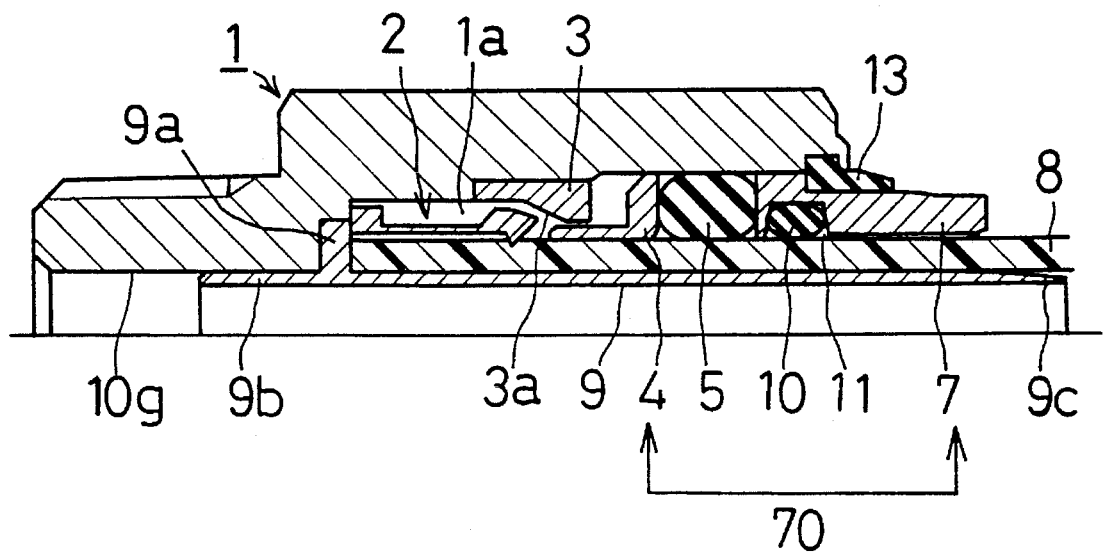
FIG. 23 is a partial cross-sectional view for illustrating the arrangements of a Tenth Preferred Embodiment according to the present tube fitting.
Figure 24:
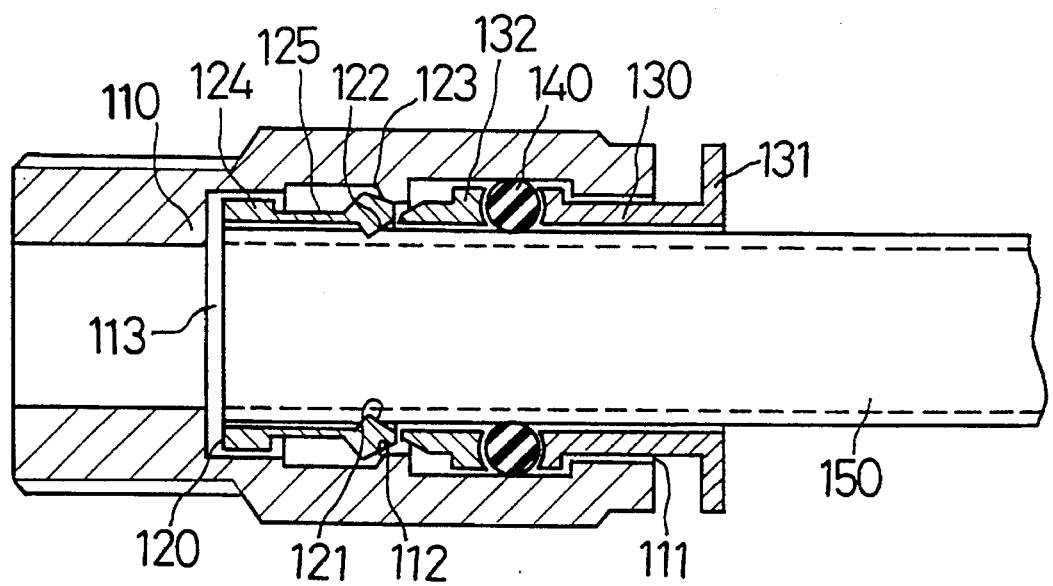
FIG. 24 is a cross-sectional view for illustrating the arrangements of the conventional tube fitting.
Figure 25:
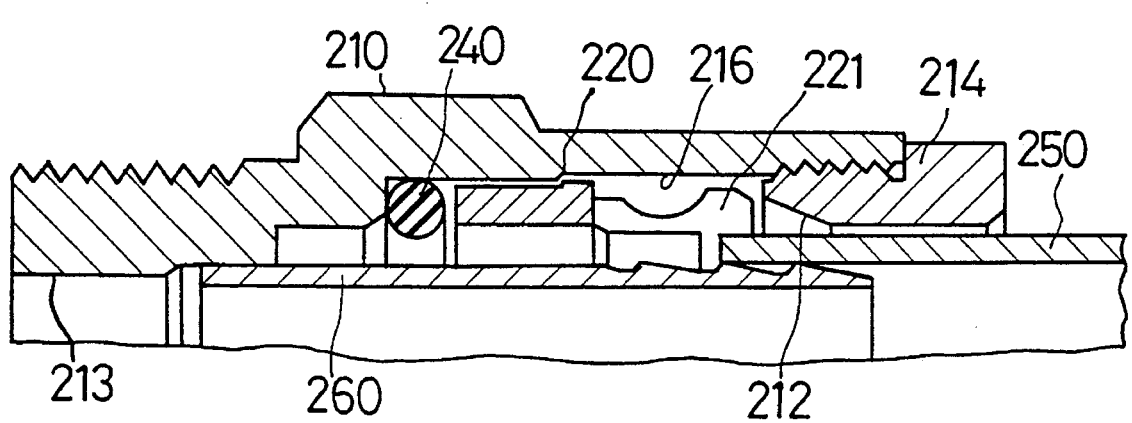
FIG. 25 is a cross-sectional view for illustrating the arrangements of another conventional tube fitting.

In the Tenth Preferred Embodiment according to the present tube fitting illustrated in FIG. 23, the length of the inner tube 9 is enlarged so as to project its free end from the end of base 7 of the releasing member 70. Other than this modification, the Tenth Preferred Embodiment is arranged identically with that of the Fourth Preferred Embodiment.

In the Tenth Preferred Embodiment, since the free end of the inner pipe 9 is positioned so as to protrude from the end of the base 7 of the releasing member 70 when the tube 8 is fixed in the axial bore 1a, the inner pipe 9 can inhibit the deformations, such as bending or the like, of the tube 8. Accordingly, this modification enables to inhibit dust, dirt or the like from intruding to the sealing ring 5.

Having now fully described the present invention, it will be apparent to one of ordinary skill in the art that many changes and modifications can be made thereto without departing from the spirit or scope of the present invention as set forth herein including the appended claims.

What is claimed is:

1. A tube fitting, comprising:

a tubular body including an opening disposed at an end, an axial bore into which a tube is fitted via the opening, and an inner peripheral surface having a tapered regulatory surface;

an annular clamping member disposed in said axial bore on said regulatory surface, held movably in an axial direction of said axial bore, and including two claws and an outer peripheral portion, each of said two claws being disposed at axially opposite ends of said clamping member, each of said two claws having an inclined surface projecting in a radial direction and engaging with an outer peripheral surface of said tube fitted into said axial bore via said opening, the outer peripheral portion contacting with said regulatory surface and being pressed in a radial direction by said regulatory surface so as to press said two claws onto the outer peripheral surface of said tube;

a releasing mechanism including a tubular base and a leading end, the tubular base disposed in said axial bore on said regulatory surface and held movably in an axial direction of said axial bore, the leading end extending from the base to an inner side of said axial bore and extending between said inclined surfaces of said claws and said outer peripheral surfaces of said tube; and a sealing ring disposed so as to seal between an inner peripheral surface of said axial bore and an outer peripheral surface of said tube fixed in said axial bore.

2. The tube fitting according to claim 1, wherein said clamping member is constructed so as to be substantially symmetrical with respect to a cross-sectional plane which contains a center of said clamping member in an axial direction thereof.

3. The tube fitting according to claim 1, wherein said body includes an inclined surface which tapers toward said opening.

4. The tube fitting according to claim 1, wherein said clamping member is made by drawing a plate blank to a tubular preform and thereafter by bending the tubular preform in a centripetal direction at an end.

5. A tube fitting, comprising:

a tubular body including an opening disposed at an end, an axial bore into which a tube is fitted via the opening, and an inner peripheral surface having a tapered regulatory surface;

an annular clamping member disposed in said axial bore on said regulatory surface, held movably in an axial direction of said axial bore, and including two claws and an outer peripheral portion, each of said two claws being disposed at axially opposite ends of said clamping member, each of said two claws having an inclined surface projecting in a radial direction and engaging with an outer peripheral surface of said tube fitted into said axial bore via said opening, the outer peripheral portion contacting with said regulatory surface and being pressed in a radial direction by said regulatory surface so as to press said two claws onto the outer peripheral surface of said tube;

a tubular inner pipe disposed in said tube, fitted into said axial bore via said opening, coaxially with an inner peripheral surface of said tube at an end of said tube;

a releasing mechanism including tubular base and a leading end, the tubular base disposed in said axial bore on said regulatory surface and held movably in an axial direction of said axial bore, the leading end extending from the base to an inner side of said axial bore and extending between said inclined surfaces of said two claws and said outer peripheral surface of said tube; and a sealing ring disposed so as to seal between an inner peripheral surface of said axial bore and an outer peripheral surface of said tube fixed in said axial bore.

6. The tube fitting according to claim 5, wherein said clamping member is constructed so as to be substantially symmetrical with respect to a cross-sectional plane which contains a center of said clamping member in an axial direction thereof.

* * * * *